ated Patent [19]

Taki

[11] Patent Number: 4,973,119
[45] Date of Patent: Nov. 27, 1990

[54] OPTICAL WAVEGUIDE ISOLATOR
[75] Inventor: Kazunari Taki, Nagoya, Japan
[73] Assignee: Brother Kogyo Kabushiki Kaisha, Aichi, Japan
[21] Appl. No.: 367,945
[22] Filed: Jun. 19, 1989
[30] Foreign Application Priority Data
 Jun. 21, 1988 [JP] Japan .................. 63-152665
[51] Int. Cl.$^5$ .......... G02B 6/10; G02B 5/30; G02F 1/00
[52] U.S. Cl. .............. 350/96.13; 350/96.12; 350/96.14; 350/375; 350/377; 455/602
[58] Field of Search ............ 350/96.11, 96.12, 96.13, 350/96.14, 96.15, 96.17, 370, 374, 375, 376, 377; 455/602

[56] References Cited
U.S. PATENT DOCUMENTS

| 3,822,927 | 7/1974 | Zernike | 350/96.12 X |
| 3,830,555 | 8/1974 | Warner | 350/375 |
| 3,860,325 | 1/1975 | Matsushita et al. | 350/375 |
| 3,995,936 | 12/1976 | Hepner et al. | 350/96.12 X |
| 4,707,058 | 11/1987 | Tolksdorf et al. | 350/96.12 |
| 4,712,855 | 12/1987 | Tolksdorf et al. | 350/96.12 |
| 4,798,434 | 1/1989 | Dammann et al. | 350/96.11 |
| 4,898,440 | 2/1990 | Tamada et al. | 350/96.13 |

Primary Examiner—Brian Healy
Attorney, Agent, or Firm—Oliff & Berridge

[57] ABSTRACT

An optical isolator serving as a unidirectional waveguide for preventing light reflected by various optical devices from being applied to a semiconductor laser. The optical isolator includes a mode converter for effecting a mode conversion of a light beam. The mode converter comprises a magnetic thin film having magnetooptic effects, and a substrate having a refractive index relatively close to the refractive index of the magnetic thin film. The mode converter is magnetized in a direction lying in a plane substantially normal to the direction in which light is propagated through the mode converter and inclined to the surface of the magnetic thin film.

3 Claims, 3 Drawing Sheets

OPTICAL WAVEGUIDE ISOLATOR

BACKGROUND OF THE INVENTION

The present invention relates to an optical isolator serving as a unidirectional waveguide for preventing light reflected by various optical devices from being applied to a semiconductor laser used as light source in optical communications, optical disc systems, or the like, thereby to stabilize excitation of the semiconductor laser.

Thin-film optical isolators having sufficient characteristics have not yet been achieved so far. One conventional two-region optical isolator is illustrated in FIG. 8 of the accompanying drawings. The two-region optical isolator generally comprises a substrate 81 made of GGG ($Gd_3Ga_5O_{12}$) or the like, a magnetic thin film 82 formed on the substrate 81 of YIG ($Y_3Fe_5O_{12}$), Bi: YIG ($Bi_x Y_{3-x}Fe_5O_{12}$), Bi:GdID ($Bi_x Gd_{3-x}Fe_5O_{12}$), or the like, and a pair of metallic cladding layers 83 made of Al or the like and placed on the magnetic thin film 82. Mode selectors 84 including the matallic cladding layers 83 largely attenuate a light beam in a TM mode, but only passes a laser beam in a TE mode. A mode converter 85 comprises a non-reciprocal region 86 and a reciprocal region 87. The magnetic thin films in these regions are magnetized respectively in a direction parallel to the direction in which the light beam is propagated and in a direction normal to the light beam propagating direction and inclined at $\theta$ to a direction normal to the film surface. The non-reciprocal and reciprocal regions 86, 87 effect 50% of non-reciprocal and reciprocal mode conversion due to the Faraday effect and the Cotton-Mouton effect, respectively. The mode conversion effected by the non-reciprocal region 86 cancels out the mode conversion effected by the reciprocal region 87 in a forward direction, and the mode conversion effected by the non-reciprocal region 86 is added to the mode conversion effected by the reciprocal region 87 in a reverse direction. More specifically, a light beam entering the optical isolator from its lefthand end (as shown) is transmitted only in the TE mode by one of the mode selectors 84. 50% of the light beam in the TE mode is then converted into a light beam in the TM mode by the non-reciprocal region 86 due to the Faraday effect. The reciprocal region 87 effects mode conversion due to the Cotton-Mouton effect to cancel out the mode conversion effected by the non-reciprocal region 86 due to the Faraday effect. Therefore, the light beam transmitted in the TM mode is converted back to the light beam in the TE mode again. Accordingly, the light beam passes through the other mode selector 84 and leaves the optical isolator from the righthand end thereof.

Conversely, a light beam that has entered the optical isolator from the righthand end is transmitted only in the TE mode by the mode selector 84 and 50% of the light beam is converted into a light beam in the TM mode by the reciprocal region 87. The remaining 50% of the light beam in the TE mode is further Converted into a light beam in the TM mode by the mode conversion in the non-reciprocal region 86. Therefore, since the light beam transmitted only in the TE mode from the mode selector 84 is entirely attenuated, and no light beam is discharged from the lefthand end of the optical isolator.

Other conventional optical isolators include single-region optical isolators disclosed in Electronic and Communications Society Technical Research Reports MW 86-124 (1986 written by Ueki and Miyazaki and MW 86-126 (1986) written by Taki and Miyazaki.

In the two-region optical isolator, the two adjacent non-reciprocal and reciprocal regions must be magnetized in mutually different directions. However, it is very difficult to orient the magnetization in different directions. The directions of magnetization vary complexly in the vicinity of the boundary between the non-reciprocal and reciprocal regions, and so do the magnitudes of mode conversion, with the result that no desired characteristics are obtained. Any clear data on the structural conditions and conditions for applying the magnetic field are not given with respect to the single-region optical isolators. Single-region optical isolators with sufficient characteristics have not yet been accomplished. Since the conventional optical isolators propagate light beams in multiple modes, their optical isolation capability is greatly lowered by higher-order-mode components of light that has returned to the optical isolators.

SUMMARY OF THE INvENTION

In view of the foregoing shortcomings of the conventional optical isolators, it is an object of the present invention to provide an optical isolator which has a single direction of magnetization, is simple in structure, can be easily manufactured practically, and is operable to propagate a light beam in a single mode.

To achieve the above object, an optical isolator according to the present invention has a mode converter including a magnetic thin film and a substrate or an intermediate layer which has a refractive index relatively close to the refractive index of the magnetic thin film. The mode converter is magnetized in a direction lying in a plane substantially normal to the direction in which light is propagated through the mode converter and inclined at an angle to the surface of the magnetic thin film.

Since the refractive index of the substrate or the intermediate layer is close to that of the magnetic thin film, the phase matching film thickness for effecting 100% mode conversion in a reverse direction is near a cut-off film thickness, increasing the component of an electric field in the light propagating direction. Therefore, the mode conversion involving the electric field component in the light propagating direction is increased. With the mode converter magnetized in the direction substantially normal to the light propagating direction and inclined to the film surface, the mode conversion involving the electric field component in the light propagating direction is of the same level as that of the mode conversion which only involves the component of the electric field perpendicular to the light propagating direction. Inasmuch as these mode conversions cancel out each other in the forward direction and are added to each other in the reverse direction, unidirectional mode conversion can be accomplished. The unidirectional mode conversion can be achieved with ease since the direction of magnetization of the mode converter is uniform, irrespective of locality. Light is propagated in a single mode because the film thickness for generating unidirectional mode conversion is smaller than a cut-off film thickness in a first order mode.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
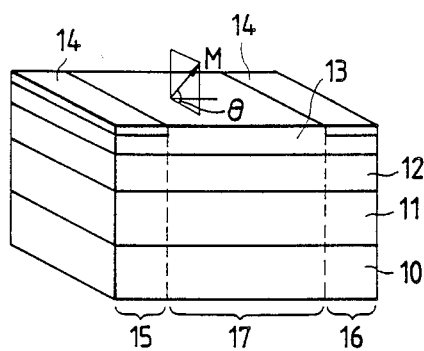
FIG. 1 is a perspective view of an optical isolator according to the present invention.

FIG. 1 shows an optical isolator in accordance with the present invention. The optical isolator comprises a substrate of GGG, an intermediate layer 11 of Bi:YIG formed on the substrate 10, a waveguide layer 12 of Bi:YIG formed on the intermediate layer 11, an upper dielectric layer 13 of ZnO or the like formed on the waveguide layer 12, and a pair of cladding layers 14 of Al formed on the upper dielectric layer 13 on opposite ends thereof, these layers 11, 12, 13, 14, being deposited by sputtering or LPE Liquid Phase Epitaxy). The optical isolator includes a pair of mode selectors 15, 16 including the cladding layers 14, respectively, and positioned at respective ends of the optical isolator. A mode converter 17 is positioned between the mode selectors 15, 16 and is magnetized by a permanent magnet or an electromagnet (not shown) in a direction lying in a plane normal to the direction in which a light beam is propagated through the optical isolator, and inclined at $\theta$ to the normal to the layer surfaces. In order to confine the light beam in the waveguide layer 12, it is necessary that the refractive index $n_{2s}$ of the intermediate layer 11 is smaller than the refractive index $n_1$ of the waveguide layer 12. Therefore, it is necessary to make the concentration of Bi in the intermediate layer 11 smaller than the concentration of Bi in the waveguide layer 12. The magnitude of the refractive index of the intermediate layer 11 can be controlled by the concentration of Bi therein.

Figure 2:
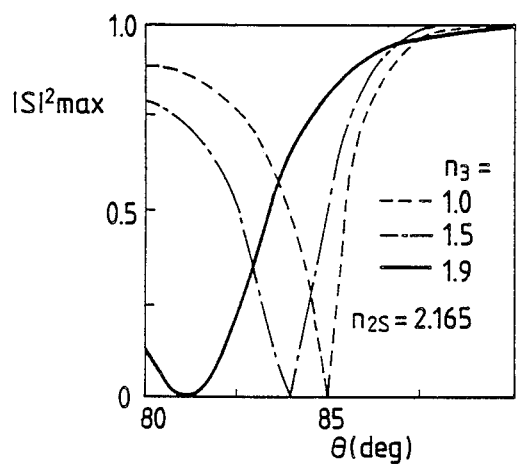
FIG. 2 is a diagram illustrating mode conversion characteristics of the optical isolator shown in FIG. 1.

FIG. 2 illustrates mode conversion characteristics of the mode converter 17 shown in FIG. 1. The refractive index of the waveguide layer 12 was selected to be $n_1 = 2.18$, the birefringence thereof $\Delta n_1 = 1.28 \times 10^{-3}$ and the first and second order magnetooptic factors thereof $f_1^e = -4.185 \times 10^{-3}$ and $f_{44}M^2 = 0.2 f_1^e M$. The intermediate layer 11 was thick enough to be regarded as a substrate and also to make any influence of the substrate 10 negligible, and had a refractive index of $n_{2s} - 2.165$. The birefringence and magnetooptic effects of the intermediate layer 11 were ignored. The thickness of the waveguide layer 12 was selected such that the maximum value of the mode conversion efficiency in the reverse direction is $|S|^2\text{max} = 1$ with respect to each value of $\theta$. Thus, unidirectional mode conversion (i.e., no mode conversion is effected in the forward direction whereas complete mode conversion is effected in the reverse direction is obtained with the value of $\theta$ at which the maximum value of the mode conversion efficiency in the forward direction is $|S|^2\text{max} = 0$ as shown in FIG. 2. FIG. 2 shows data when the upper layer 13 is made of air ($n_3 = 1.0$), glass ($n_3 = 1.5$), and ZnO ($n_3 = 1.9$). Unidirectional mode conversion is achieved irrespective of whether the upper layer is made of air, glass, or ZnO. If the intermediate layer 11 were dispensed with and the substrate 10 were used onlY as a substrate, then no unidirectional mode conversion as shown in FIG. 2 would be obtained. That is, unidirectional mode conversion can be accomplished by employing the intermediate layer 11 of Bi:YIG that can substantially be regarded as a substrate and making the refractive index of the intermediate layer sufficiently larger than that of the substrate 10 of GGG.

Figure 3:
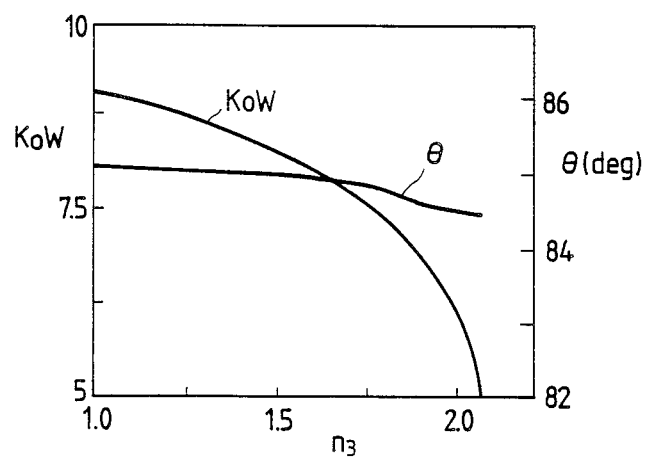
FIGS. 3 and 4 are diagrams showing numerical values for designing specific structural conditions for the optical isolator of the present invention.
Figure 4:
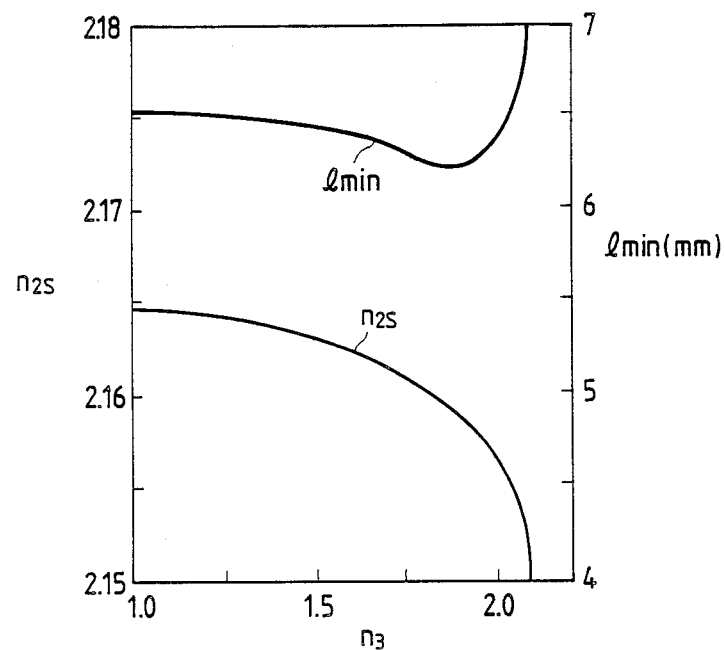

FIGS. 3 and 4 show the normalized thickness $k_0 W$ ($k_0 = 2\pi/\lambda$, $\lambda$ = wavelength) of the waveguide layer 12, the angle $\theta$ of elevation, the isolator length $l_{min}$, and the refractive index $n_{2s}$ of the intermediate layer (or the substrate) with respect to the refractive index of the upper layer 13 for achieving unidirectional mode conversion. Therefore, FIGS. 3 and 4 illustrate structural conditions for the optical isolator. It is necessary that the refractive index $n_{2s}$ of the substrate or intermediate layer is 2.15 or greater. If the refractive index or the like of the waveguide layer varies, then the structural conditions also vary.

Figure 5:
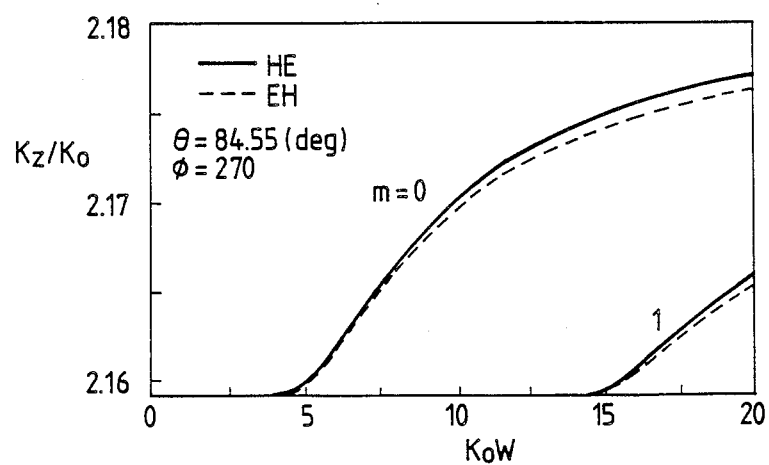
FIG. 5 is a diagram showing the relationship between the thickness of a waveguide layer and a propagation constant.

FIG. 5 shows mode dispersion characteristics at the time the refractive index of the upper layer 13 is $n_3 = 1.9$ and the refractive index of the intermediate layer 11 is $n_{2s} = 2.159$. The range of thicknesses $k_0 W$ shown in FIG. 3 is smaller than the cut-off thickness $k_0 W$ 15 in the first order mode $m = 1$), so that the optical isolator can be arranged to propagate light in a single mode. Because unidirectional mode conversion is generally effected between TE and TM modes of a certain order (normally fundamental modes), no unidirectional mode conversion is effected between other modes. The conventional optical isolator for propagating light in multiple modes is not operable with respect to higher order-mode components of light, the optical isolation capability thereof is greatly lowered by higher-order-mode components of light that has returned to the optical isolator. According to the present invention, the optical isolator has a stable optical isolation capability which is not affected by the higher-order-mode components of returning light.

Figure 6:
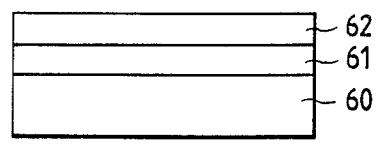
FIGS. 6 and 7 are cross-sectional views of modifications according to the present invention.
Figure 7:
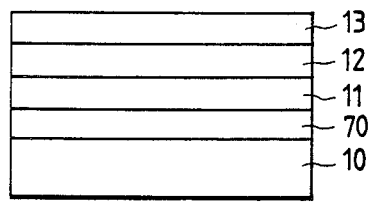
Figure 8:
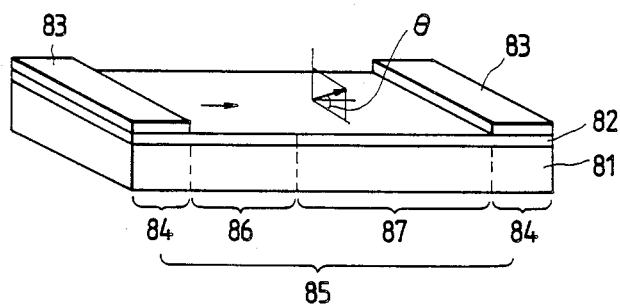
FIG. 8 is a perspective view of a conventional optical isolator.

The magnetic thin film materials used to construct the optical isolator include YIG, Bi:YIG, Bi:GdIG, for example, but may be other materials insofar as they have magnetooptic effects and are transparent in a wavelength range that is used. The material of the intermediate layer is not required to be the same as that of the waveguide layer. In order to make the refractive index of the intermediate layer smaller than that of the waveguide layer, the composition of the intermediate layer may be varied by replacing a portion of Fe with Al, for example, rather than lowering the concentration of Bi. The substrate 10 may be made of a garnet crystal having a higher refractive index or any of various other materials, instead of GGG. The upper layer 13 may not necessarily be required. Furthermore, as shown in FIG. 6, a waveguide layer 61 of Bi:YIG or a magnetic garnet film may be formed on a substrate 60 of GGG or the like, and an upper layer 62 having a predetermined refractive index as shown in FIG. 4 may be deposited on the waveguide layer 61. Since the upper layer and the substrate are differentiated comparatively from each other, any of them may be used as a substrate if they have a combination of refractive indexes as shown in FIG. 4.

The direction of magnetization may not necessarily be perpendicular strictly to the direction of propagation of light. The direction of magnetization is determined by the magnitude of the magnetooptic effects and the thicknesses of the layers, and is generally perpendicular to the direction of propagation of light.

The magnetic garnet film used as the intermediate layer also has magnetooptic effects and hence contributes to mode conversion. By making the intermediate layer of a garnet film such as of $(BiLuGd)_3Fe_5O_{12}$ which has temperature characteristics of magnetooptic effects opposite to those of the waveguide layer such as of $(BiGd)_3(FeGa)_5O_{12}$, stable optical isolation capability can be obtained over a wide temperature range. The refractive indexes of the intermediate and waveguide layer may not necessarily vary stepwise but may vary continuously. For example, the waveguide and intermediate layers may be grown from the same melted material by LPE at different growth temperatures, respectively. More specifically, for making the intermediate layer, the concentration of Bi therein may be reduced by either rendering the growth temperature higher than that for making the waveguide layer or reducing the rotational speed of the substrate. The refractive indexes may be continuously varied by gradually varying the growth temperature or the rotational speed of the substrate.

In FIG. 1, a higher-order-mode component of light may be reflected by the boundary between the intermediate layer 11 and the substrate 10, and transmitted by the waveguide layer 12 and the intermediate layer 11. To prevent this, a light absorbing layer 70 may be interposed between the substrate 10 and the intermediate layer 11. The light absorbing layer 70 may be made of Bi;Pr:YIG prepared by adding an impurity of Pr (praseodymium) to Bi:YIG. Alternatively, a metallic layer of Al or the like, a layer of Bi or Pr:YIG, a layer containing dyestuff, or a light absorbing layer of black coating material may be disposed on the upper layer 62 shown FIG. 6.

With the present invention, as described above, since the mode converter of the optical isolator is magnetized in a uniform direction, the optical isolator is simple in construction. The optical isolator has a stable optical isolation capability which is not affected by higher-order-mode components of returning light because light is propogated in a single move.

Although certain preferred embodiments have been shown and described, it should be understood that many changes and modifications may be made therein without departing from the scope of the appended claims.

What is claimed is:

1. An optical isolator including a mode converter for effecting a mode conversion of a light beam, said mode converter comprising:

a magnetic thin film having magnetooptic effects and serving as a waveguiding layer; and a substrate having a refractive index smaller than the refractive index of said magnetic thin film, wherein said mode converter is magnetized in a direction lying in a plane substantially normally to the direction in which light is propagated through the mode converter and inclined to the surface of said magnetic thin film.

2. An optical isolator according to claim 1, wherein said substrate comprises a dielectric substrate, said mode converter further comprising an intermediate layer disposed between said magnetic thin film and said dielectric substrate, said intermediate layer having a refractive index smaller than the refractive index of said magnetic thin film.

3. An optical isolator according to claim 1, wherein said mode converter further comprising an upper dielectric layer formed on said magnetic thin film, the refractive index of said upper dielectric layer being smaller than that of said magnetic thin film.

* * * * *